(12) United States Patent
Hengsperger et al.

(10) Patent No.: US 7,713,336 B2
(45) Date of Patent: May 11, 2010

(54) WATER SANITAZATION SYSTEM HAVING SAFETY FEATURES AND REMOVABLE FILTER

(75) Inventors: Steve L. Hengsperger, Lakeshore (CA); Justin L. Namespetra, Essex (CA); Christopher B. Caldwell, Stoney Creek (CA); Richard S. Zulik, Beamsville (CA)

(73) Assignee: Tersano Inc., Oldcastle, Ontario (CA)

( * ) Notice: Subject to any disclaimer, the term of this patent is extended or adjusted under 35 U.S.C. 154(b) by 222 days.

(21) Appl. No.: 11/908,737

(22) PCT Filed: Mar. 17, 2006

(86) PCT No.: PCT/CA2006/000404

§ 371 (c)(1),
(2), (4) Date: Sep. 14, 2007

(87) PCT Pub. No.: WO2006/096990

PCT Pub. Date: Sep. 21, 2006

(65) Prior Publication Data

US 2008/0190825 A1 Aug. 14, 2008

Related U.S. Application Data

(60) Provisional application No. 60/662,787, filed on Mar. 18, 2005.

(51) Int. Cl.
*B01D 53/28* (2006.01)
*C02F 1/78* (2006.01)

(52) U.S. Cl. ..................... 96/117.5; 210/192

(58) Field of Classification Search .............. 96/108, 96/117.5, 147; 55/DIG. 17; 210/760, 192, 210/198.1, 205, 295, 500.21
See application file for complete search history.

(56) References Cited

U.S. PATENT DOCUMENTS

| 3,464,186 | A | * | 9/1969 | Walker et al. ............. 96/115 |
| 3,726,404 | A | | 4/1973 | Troglione |
| 3,923,662 | A | * | 12/1975 | O'Brien ................. 210/251 |

(Continued)

FOREIGN PATENT DOCUMENTS

DE 10034947 A1 2/2002

OTHER PUBLICATIONS

European Patent Application No. 06721675.4 Search Report dated Apr. 23, 2009.

*Primary Examiner*—Frank M Lawrence
(74) *Attorney, Agent, or Firm*—Curtis B. Behmann; Borden Ladner Gervais LLP

(57) ABSTRACT

A removable disposable air dryer cartridge is provided for a small enterprise water ozonation system. The cartridge includes an air inlet to receive atmospheric air, a desiccant material to remove moisture, and a dry air outlet for interfacing with the ozonation system to provide dry air to an ozone generator. This facilitates better ozonation of water in the system, since dry air reacts better in an ozone generator, achieving higher concentrations of ozone gas, thus resulting in a better "kill rate" when ozonated water is applied to bacteria. The air dryer can be provided as a chamber of a combined air dryer and water filter cartridge, the other chamber being a water filter chamber having a water filter for extracting large particles of material from the water stream in order to prevent damage to the system.

24 Claims, 11 Drawing Sheets

U.S. PATENT DOCUMENTS

| | | | |
|---|---|---|---|
| 4,427,426 A * | 1/1984 | Johnson et al. | 422/186.09 |
| 4,741,697 A * | 5/1988 | Herbison | 433/25 |
| 4,999,034 A * | 3/1991 | Mager et al. | 96/117.5 |
| 5,587,131 A * | 12/1996 | Malkin et al. | 422/186.11 |
| 5,673,493 A * | 10/1997 | Kazakis et al. | 34/80 |
| 5,683,576 A * | 11/1997 | Olsen | 210/138 |
| 6,475,352 B2 | 11/2002 | Conrad | |
| 6,491,811 B2 | 12/2002 | Conrad et al. | |
| 6,491,879 B2 | 12/2002 | Conrad | |
| 6,616,737 B1 * | 9/2003 | Evans et al. | 96/135 |
| 2002/0060177 A1 | 5/2002 | Conrad | |
| 2002/0060189 A1 | 5/2002 | Conrad | |
| 2004/0258475 A1 * | 12/2004 | Welin et al. | 404/71 |

* cited by examiner

WATER SANITAZATION SYSTEM HAVING SAFETY FEATURES AND REMOVABLE FILTER

CROSS REFERENCE TO RELATED APPLICATIONS

This application claims the benefit of priority of U.S. Provisional Patent Application No. 60/662,787 filed Mar. 18, 2005, which is incorporated herein by reference.

FIELD OF THE INVENTION

The present invention relates generally to devices for water sanitization. More particularly, the present invention relates to a system for water sanitization having a base unit.

BACKGROUND OF THE INVENTION

Increased concern from the public on issues of water quality has resulted in an explosion of water filtration devices on the market, particularly for household use. A popular household water filtration device is in the style of a pour-through pitcher. Typically, unfiltered water is added to a basin at the top of the device. Through the action of gravity, water percolates through a filtering media (usually consisting of granulated activated carbon) located between the basin and a collection reservoir. Filtered water is then dispensed from the collection reservoir for drinking. For the general public, gravity-controlled pitcher-type water filtration systems are cost effective. Many such water filtration systems are provided under the Brita® brand name.

One limitation of this kind of device is the inability to filter out and destroy smaller organisms and microbes. Other devices have been provided that provide additional purification or sanitization. Such systems typically include a water reservoir of some sort to be used with a base unit having additional purification technology. That way, water filtered in the usual manner in the filtering media in the reservoir is further purified by the additional purification technology.

Many water sanitization systems make use of ozonation to purify water. Some industrial water treatment systems include an air dryer comprising a desiccant provided in a reusable container, in order to increase efficiency of the ozonation process. The desiccant dries the air to remove moisture, typically in order to prevent damage to system elements. However, it is also known that dry air reacts better in an ozone generator, yielding better ozone concentration output. Often, the desiccant is separated into two storage areas, so that one portion of the desiccant is regenerated, while another portion of the desiccant is employed to dry the air. Regeneration is desired in industrial systems because of the large amount of desiccant used, and can be achieved by heating, refrigeration, or other approaches.

However, it can be impractical to attempt to use the regeneration approach of industrial systems in a small enterprise water treatment product. The term "small enterprise" as used herein represents an application that is low-volume and has a low number of users as compared to an industrial or municipal product. A small enterprise includes a small office, a division or branch of a large institution, a household, or any other environment that would be considered to be a consumer market.

Test research has shown that the procedure to regenerate desiccant material for a small enterprise water treatment system is generally too difficult for a small enterprise user, or consumer. It would typically require heating the desiccant in an oven under very strict constraints, and it was found that heating in a microwave does not yield proper results. Moreover, attempting to use the regeneration process could result in the small enterprise user misusing the product, and would likely be harmful to health, either by way of the regeneration process itself, or due to using the supposedly regenerated desiccant. Some ozone systems have expressly written off the use of air dryers in household or small commercial products due to the complications introduced by the regeneration process.

Known air dryers for industrial systems, which are primarily directed to drying compressed air, have valves in order to selectively restrict flow of air into the chamber housing the desiccant. These valves, often implemented as control valves, are used in order to perform the purging, vacuum and regeneration steps. Control valves are also used to prevent prolonged exposure of the desiccant to atmospheric air. If a desiccant is exposed to atmospheric air for too long a period of time, the desiccant gets used up too quickly and loses its effectiveness as a desiccant.

There are, therefore, issues with industrial applications of air dryers in water treatment systems that need to be resolved before the concepts in such systems can be used in a product intended for small enterprise use.

It is, therefore, desirable to provide a water sanitization system that overcomes at least one disadvantage of known water sanitization systems.

SUMMARY OF THE INVENTION

It is an object of the present invention to obviate or mitigate at least one disadvantage of previous water sanitization systems.

In a first aspect, the present invention provides a removable disposable air dryer cartridge for a small enterprise water ozonation system, including: an air inlet portion defining an air inlet opening to receive atmospheric air; a container portion, connected to the air inlet portion, comprising a desiccant material to remove moisture from atmospheric air; and a dry air outlet portion, connected to the container portion, the dry air outlet portion defining an outlet opening and comprising a base unit interface for interfacing with an air pathway of a base unit of the small enterprise water ozonation system to provide dry air to an ozone generator.

The air inlet slit and/or the air outlet opening can be sized to enable air flow during operation and to allow insignificant air flow when the system is idle. The container portion can define a desiccant viewing window to view the colour of the desiccant, in order to determine if the cartridge needs to be replaced. The air inlet portion can define a plurality of air inlet slits. In one embodiment, the cartridge defines two air inlet slits positioned opposite each other along the perimeter of the air inlet portion. An air inlet cross sectional opening area can be in the range of about 5 mm$^2$ to about 30 mm$^2$, preferably from about 5 mm$^2$ to about 15 mm$^2$, and most preferably about 10 mm$^2$. In the case of a plurality of air inlet slits, the combined cross-sectional opening area of the plurality of air inlet slits is preferably about 10 mm$^2$.

The desiccant material is preferably non-carcinogenic, such as $SiO_2$. The cartridge can include about 30 grams of the desiccant material. The cartridge can be valveless.

In another embodiment, the present invention provides a removable disposable combined water filter and air dryer cartridge for a small enterprise water ozonation system having a water flow path and an air flow path. The cartridge includes a water filter chamber including a water filter to extract particles of material from the water flow path to prevent damage to the system. The water filter can include a permeable membrane. The cartridge also includes an air dryer chamber provided in the air flow path.

The air dryer chamber includes: an air inlet portion defining an air inlet opening to receive atmospheric air; a container portion, connected to the air inlet portion, including a desiccant material to remove moisture from atmospheric air; and a dry air outlet portion, connected to the container portion, the dry air outlet portion defining an outlet opening and comprising a base unit interface for interfacing with the air flow path of a base unit of the small enterprise water ozonation system to provide dry air to an ozone generator. The air dryer chamber can have features similar to those described above in relation to the removable disposable air dryer cartridge.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a removable disposable air dryer cartridge for a small enterprise water ozonation system. The cartridge includes an air inlet to receive atmospheric air, a desiccant material to remove moisture, and a dry air outlet for interfacing with the ozonation system to provide dry air to an ozone generator. This facilitates better ozonation of water in the system, since dry air reacts better in an ozone generator, achieving higher concentrations of ozone gas, thus resulting in a better "kill rate" when ozonated water is applied to bacteria. The air dryer can be provided as a chamber of a combined air dryer and water filter cartridge, the other chamber being a water filter chamber having a water filter for extracting large particles of material from the water stream in order to prevent damage to the system. There is also description of some features of a base unit of a small enterprise water ozonation system to interface with the removable cartridge.

Figure 1:
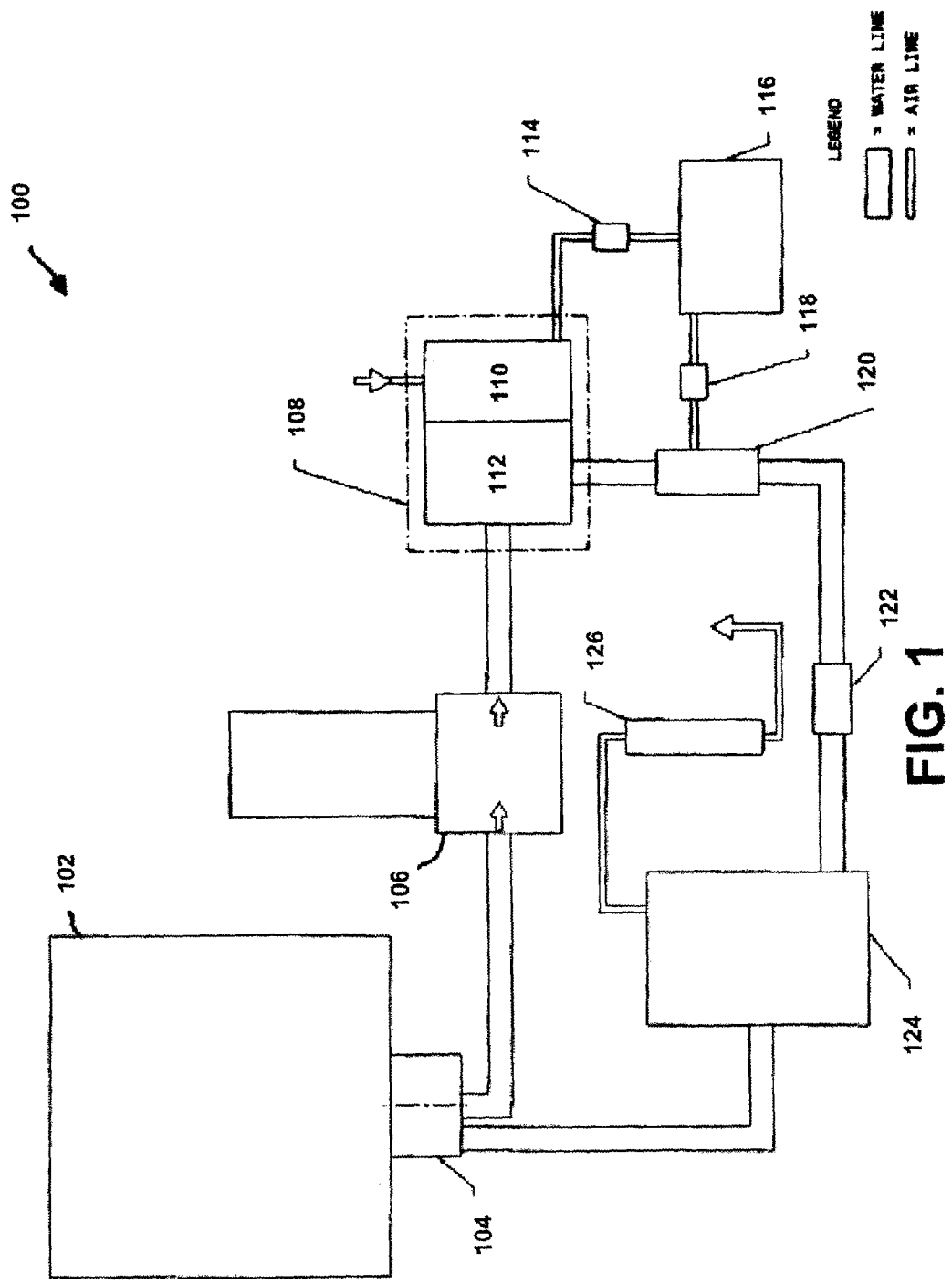
FIG. 1 is a mechanical system diagram of a drinking water sanitization system according to an embodiment of the present invention.

FIG. 1 is a mechanical system diagram of a drinking water sanitization system 100 according to an embodiment of the present invention, showing both water and air paths. In discussions of this figure, the terms "after" and "before" are used with respect to the water or air flow within the system. The direction of water flow is illustrated at pump motor 106, whereas the direction of air flow is illustrated at air dryer 110.

A reservoir 102 is provided for containing water that is to be, or is being, sanitized/purified. The reservoir 102 is typically a removable drinking water pitcher, though other removable containers can be provided for holding water, not necessarily drinking water. Examples of such containers are discussed in commonly assigned International Patent Application No. WO 2004/113232, published on Dec. 29, 2004, which is incorporated herein by reference. A fluid transfer port or valve 104 is provided at the interface of the reservoir 102 with a base unit incorporating the other elements of the system according to an embodiment of the present invention. The fluid transfer valve 104, or fluid control port or liquid interface, allows the control of fluids, and in particular, but not limited to, the control of fluids into and out of the container, which allows the container to be removed without leaking.

The flow into and out of the container may occur simultaneously or sequentially. In the case of simultaneous outflow and inflow, water is taken from the reservoir 102, processed, and pumped back to the reservoir. This is preferably done in such a way that the fluid level in the reservoir is maintained during processing (i.e. the fluid is not drained from the reservoir, processed and then pumped back into the reservoir). The fluid transfer valve 104 can be implemented in any number of ways, such as by way of separate check valves for inflow and outflow, or a single double check valve for both inflow and outflow. The double check valve arrangement allows water to flow out of and into the container simultaneously while using a single connection point.

In order to improve mixing, a DCV cap (not shown in the figures) can be provided at the fluid transfer valve when it is implemented as a double check valve. An angled section of the DCV cap can preferably be removed to allow the water entering the reservoir from the base unit to be less impeded and therefore faster moving. This faster moving water causes greater mixing in the reservoir and means the dissolved ozone level gets up higher and faster in the reservoir.

Water flows from the reservoir 102, through the fluid transfer valve 104 to a pump motor 106 provided after the reservoir 102 to draw water from the reservoir. Although the pump head and motor functions can be separated, they are typically implemented in a unitary motor/pump assembly, such as the pump motor 106, and will be discussed as such herein, keeping in mind that other implementations are possible. The electronics are typically connected to the motor portion, but the pump and motor are interconnected.

A replaceable cartridge 108, which is removable and preferably disposable, is provided according to an embodiment of the present invention. The cartridge 108 can include an air dryer 110 for function in the air flow path, or air line, of the system and/or a water filter 112 for function in the water flow path, or water line, of the system. The structure and functions of the cartridge 108 will be discussed later in further detail. In terms of air circulation in the system, air typically is drawn in from the atmosphere via the air dryer 110, and can then pass through an inlet valve 114, an ozone generator 116, an outlet valve 118, and an ozone contacting device, or mixing device, 120, such as a venturi.

The inlet and outlet valves 114 and 118, alternatively referred to as transfer ports, are optional components of the system and can be implemented as check valves. They serve to improve performance of the system, and particularly the ozone generator 116. The valves 114 and 118 co-operate to ensure that when the unit is not running, little or no residual ozone gas can diffuse out of the system to atmosphere. Some safety guidelines and regulations include a virtual no ozone gas emissions requirement. The valves 114 and 118 assist in achieving such requirements. The outlet valve 118 prevents water from backing up into the ozone generator 116 via the ozone contacting device 120 when the unit is at rest with a reservoir, or attachment, on it.

The ozone generator 116, which can be a corona-discharge type, converts a portion of the oxygen in the air (drawn from the atmosphere) into ozone. The ozone is mixed with the water in the ozone contacting device 120. The water ozone mixture then preferably passes through an ozone gas atomizer 122 before passing into an off-gas unit 124, which removes the air and undissolved ozone. The removed gas is directed to an ozone destructor 126, which converts ozone into oxygen and safely releases it into the atmosphere.

The ozone gas atomizer 122 is provided downstream of the ozone contacting device 120 and just before the inlet port of the off-gas unit 124 in order to increase the contact time between the micro bubbles of ozone gas and the water. The geometry of a preferably necked down inlet port of the off-gas and the cyclonic action of the gas/liquid mixture in the off-gas makes the off-gas also act as a mixing device. This feature can significantly increase the dissolved ozone level in the water. An accumulator (not shown in the figures) can preferably be provided at the top of the off-gas unit 124 that captures excess water that escapes out of the off-gas via the gas line. This accumulator can drain the excess water back into the off-gas when the unit is at rest. Having this accumulator prevents water from getting into ozone destructor 126 when the unit is inverted. If the ozone destructor 126 (such as provided by CARULITE®) gets wet, it is rendered ineffective at destroying ozone gas.

A sealing check valve (not shown in the figures) can preferably be provided between the off-gas 124 and the ozone destructor 126. This sealing check valve seals the system from atmosphere in such a way that when the unit is inverted in an attempt to drain water out of it, water is prevented from leaving the system. It is the same principle as inserting a straw in a drink, covering the end of the straw and then removing the straw—the drink stays trapped in the straw. This is advantageous in a unit according to an embodiment of the present invention as it can keep all components wet and the pump primed.

As described earlier with respect to FIG. 1, embodiments of the present invention include a removable filter cartridge provided in a base unit of a water sanitization system. The removable filter cartridge 108 can include an air dryer 110 and optionally a water filter 112.

Some known products, such as the Pneupac Compressed Air Dryer, provide a one-piece desiccant replacement cartridge. However, the Pneupac system is not for use in an ozone system, but rather for use in an air line in a pneumatic tool to prevent moisture from building up and rusting out components. Another known system by Oxygen Generating Systems Intl., a division of Audubon Machinery Corporation, shows an industrial scale water treatment system in which an air dryer is provided after an air compressor and before an oxygen generator and ozone generator. However, again this system is drying compressed air. The system of embodiments of the present invention does not dry compressed air, but rather dries air at atmospheric pressure. The term "atmospheric air" as used herein represents air that is uncompressed and drawn from the atmosphere, and is at atmospheric pressure, taking into account that atmospheric pressure varies with changes is factors such as altitude and weather patterns.

As mentioned earlier, the present invention takes advantage of the fact that dry air reacts better in an ozone generator, yielding better ozone concentration output, which in turn results in a better "kill rate" with respect to bacteria when ozonated water is applied to food, items or surfaces.

Removable Cartridge with Air Dryer

In a first embodiment, the removable filter cartridge includes an air dryer 110 and does not include a water filter. The air dryer 110 comprises a desiccant material that removes moisture from air.

The air dryer 110 can be placed anywhere in the base unit as long as it is before the ozone generator 116 and the ozone contacting device 120 with respect to air flow. The ozone contacting device 120 draws air from the atmosphere into the air dryer 110 and then into the ozone generator 116. Dry air can achieve much higher concentrations of ozone gas than humid air in a corona discharge ozone generator. As such, embodiments of the present invention provide a significant increase to the concentration of dissolved ozone in the water. An examination of experimental test results shows an increase in ozone concentration from approximately 1 ppm without the air dryer to over 3.5 ppm with the air dryer.

Figure 2:
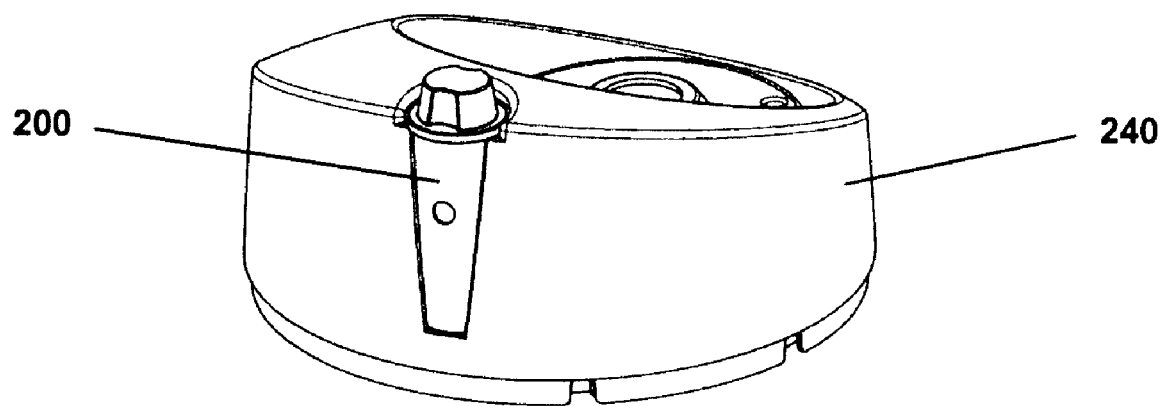
FIG. 2 is a back perspective view of a removable air dryer cartridge installed in a base unit according to an embodiment of the present invention.

FIG. 2 is a back perspective view of a removable air dryer cartridge 200 installed in a base unit 240 according to an embodiment of the present invention. The removable air dyer cartridge 200 is a particular embodiment of the removable cartridge 108 having an air dryer and no water filter, and also having features specific to its use and interconnection with a base unit.

Figure 3:
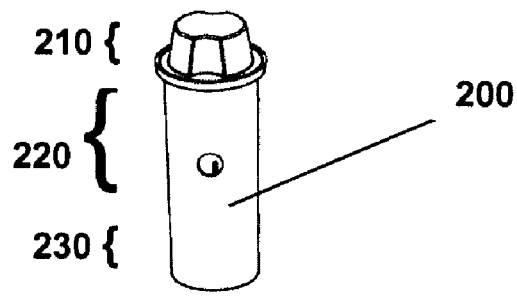
FIG. 3 is a back perspective view of a removable air dryer cartridge removed from a base unit according to an embodiment of the present invention, showing the base unit interface port and seal.
Figure 3:
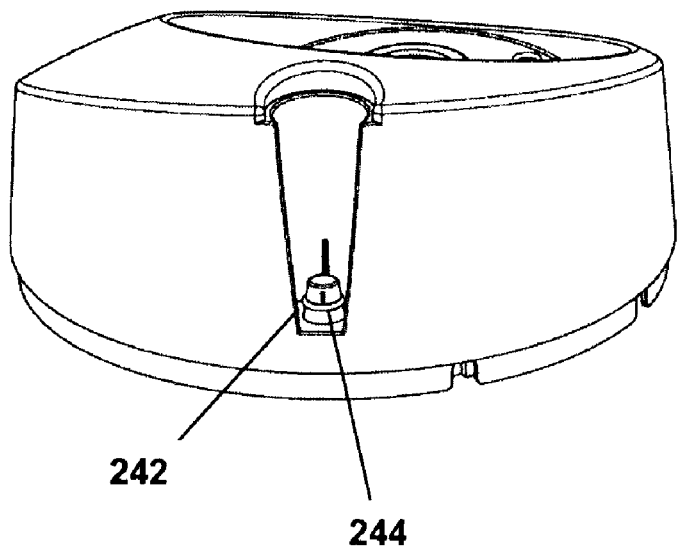

FIG. 3 is a back perspective view of the removable air dryer cartridge 200 removed from a base unit 240 according to an embodiment of the present invention, showing the base unit interface port and seal. The cartridge 200 has an inlet portion, or inlet end, 210 and a dry air outlet portion, or outlet end, 230, which correspond in FIG. 3 to the top end and the bottom end, respectively. A container portion, 220, is shown, connected to the air inlet portion 210 at one end, and to the dry air outlet portion 230 at the other end. In a presently preferred embodiment, each of the three portions are integrally formed into the assembled removable air dryer cartridge 200.

The container portion 220 houses a desiccant material. Desiccant material is known to change color when it loses its drying properties, thereby reducing effectiveness. So, in a preferred embodiment, the removable air dryer cartridge defines or includes a window or hole 222 for viewing the color of the desiccant. This assists a user in determining if and when a cartridge should be replaced, without needing to use a calendar or other approaches to keep track of when a cartridge's effectiveness has fallen below a desired level.

Of course, an automated means such as a sensor can be included in the cartridge, or in the base unit with which the cartridge interfaces, to sense or scan the colour of the desiccant and provide an indication to replace the cartridge if the scanned desiccant colour is within a certain colour band or frequency. In such a case, the desiccant viewing window does not need to face outwards from the base unit, but could open to the inside of the base unit, where the colour scanner can be provided.

FIG. 3 also shows an interface port 242 in a base unit of a small enterprise water ozonation system, to interface with the outlet portion 230 of the cartridge 200. The interface port 242 preferably includes an interface seal 244, such as an O-ring, to seal against the bottom of the cartridge 200. The outlet portion preferably includes a base unit interface (not shown) to interface with an air pathway of the base unit to provide dry air to an ozone generator.

In other words, in an aspect, the present invention provides a removable disposable air dryer cartridge for a small enterprise water ozonation system, including: an air inlet portion defining an air inlet opening to receive atmospheric air; a container portion, connected to the air inlet portion, comprising a desiccant material to remove moisture from atmospheric air; and a dry air outlet portion, connected to the container portion, the dry air outlet portion defining an outlet opening and comprising a base unit interface for interfacing with an air pathway of a base unit of the small enterprise water ozonation system to provide dry air to an ozone generator. The container portion can define a desiccant viewing window to view the colour of the desiccant, in order to assist a user to determine if the cartridge needs to be replaced.

As was mentioned earlier, known air dryers for industrial systems have valves in order to selectively restrict flow of air into the chamber housing the desiccant, either to perform the purging, vacuum and regeneration steps, or to prevent prolonged exposure of the desiccant to atmospheric air.

The removable air dryer cartridge according to embodiments of the present invention is valveless. Air flows from atmosphere, over the desiccant, and to the ozone generator. No valve is necessary, since the system preferably does not perform any of the steps involved in desiccant regeneration.

Figure 4:
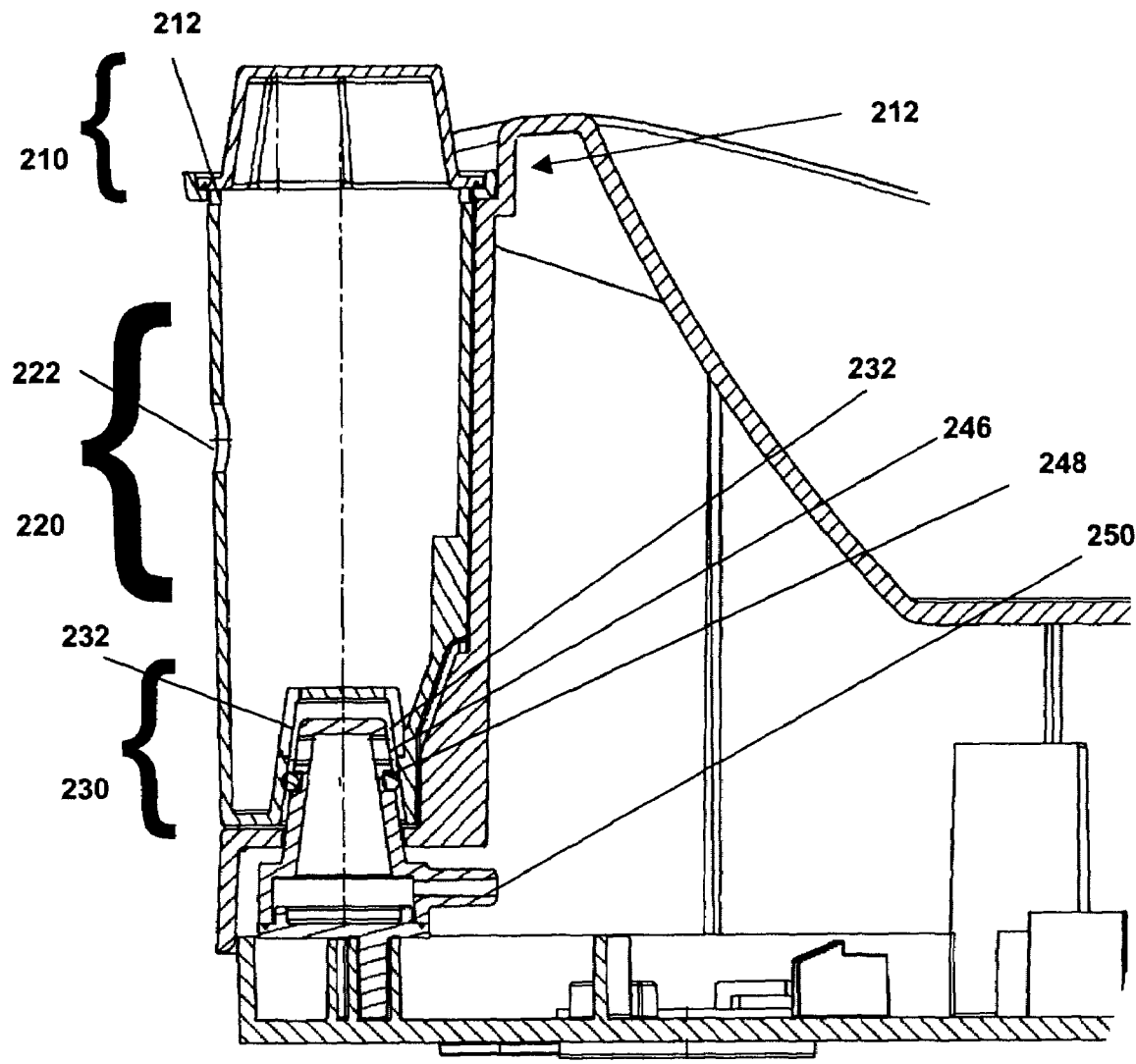
FIG. 4 is a perspective view, partly in section, of a removable air dryer cartridge installed in a base unit according to an embodiment of the present invention.

FIG. 4 is a perspective view, partly in section, of a removable air dryer cartridge 200 installed in a base unit 240 according to an embodiment of the present invention. In this embodiment, the cartridge 200 itself is valveless, and an interface of the base unit 240 with the cartridge is also valveless.

Rather than using a complicated system of valves requiring control, the cartridge and the base unit each define air openings, such as slits, which are preferably sized to be large enough to enable air flow during operation, but small enough to allow insignificant air flow when the system is idle, so that the desiccant material is conserved, and not used up. While any type of opening is possible, a presently preferred embodiment using slits is described in detail.

A cartridge air inlet slit 212 is for inflow of air from atmosphere to the cartridge, to allow the air to have contact with the desiccant material (not shown in FIG. 4). In the example in FIG. 4, there are two cartridge air inlet slits 212, positioned opposite each other along the circumference of the top of the desiccant housing portion of the cartridge. A cartridge air outlet slit 232 and a base interface port air inlet slit 246 co-operate to allow air to communicate between the cartridge and the base unit. Since embodiments of the present invention preferably do not regenerate the desiccant, there is no need for a complicated system of valves and controllers for the valves. This simplifies product design, both in terms of cost of materials and cost of maintenance, as well as ease of use for the end user, who is a consumer in this case.

FIG. 4 also shows an interface seal groove, or O-ring groove, 248 for receiving an interface seal or O-ring 244, as described in relation to FIG. 3. A port 250 is also provided to permit communication of the dried air to the rest of the base unit for subsequent ozonation.

Figure 5:
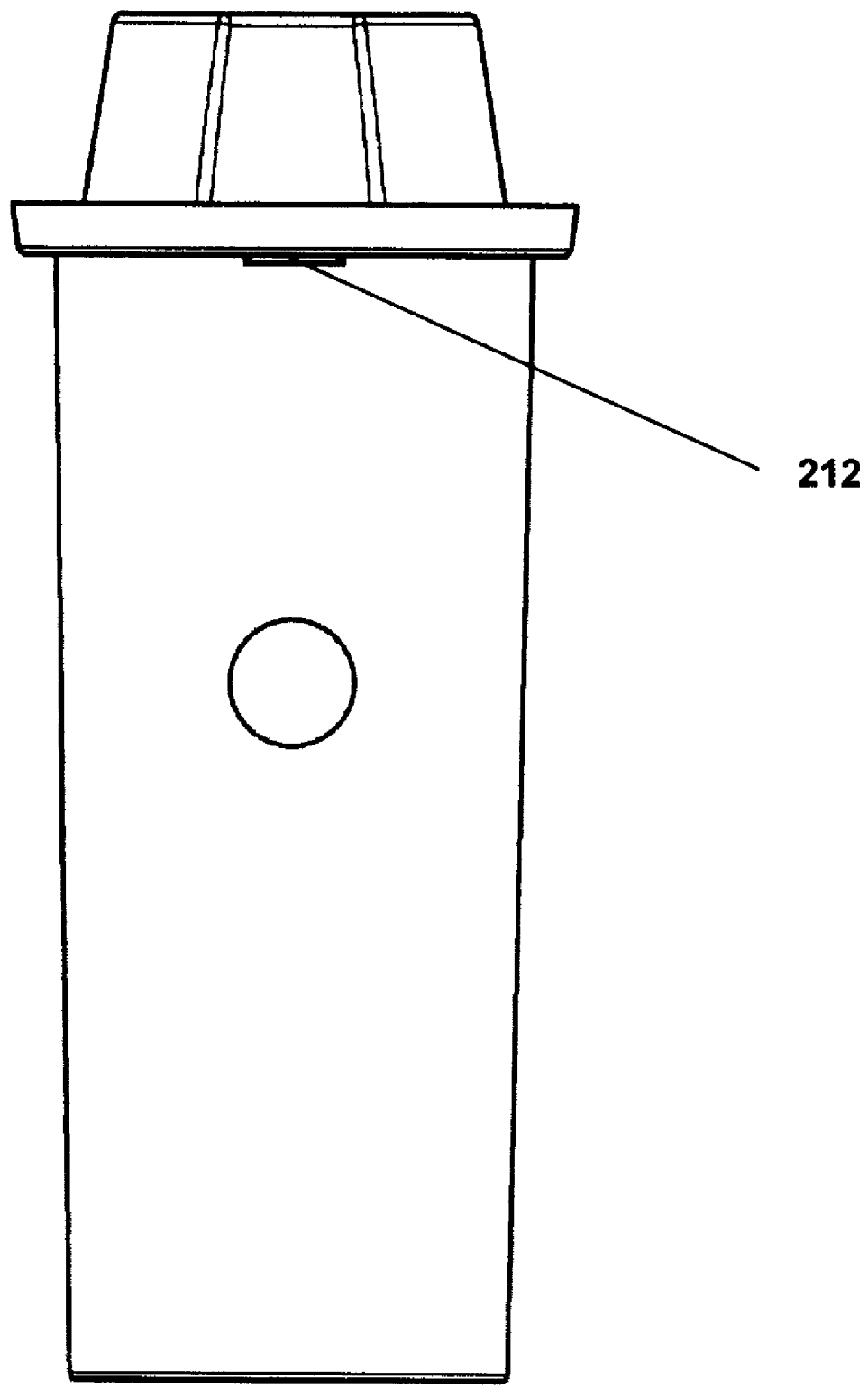
FIG. 5 is a front view of a removable air dryer cartridge according to an embodiment of the present invention.

FIG. 5 is a front view of a removable air dryer cartridge according to an embodiment of the present invention, showing air inlet openings 212. The air inlet portion can define a plurality of air inlet openings or slits, and FIG. 5 shows an embodiment in which the cartridge defines two air inlet slits positioned opposite each other along the perimeter of the air inlet portion. With respect to the exemplary embodiment in FIG. 5, each of the air inlet slits 212 has a width of about 7.95 mm and a height of about 0.65 mm. This results in a surface area opening of about 5.1675 mm$^2$ for each air inlet slit, which when taken together results in a combined air inlet slit surface area opening of about 10 mm$^2$.

Experimental testing has shown that with a combined air inlet opening surface area opening greater than about 10 mm$^2$, the desiccant within the cartridge will change colour over a brief period of being exposed to atmosphere. This is relatively undesirable, since it results in faster deterioration of the product, which would lead to unhappy consumers. However, some such deterioration can be acceptable. Therefore, an air inlet cross sectional opening area can be in the range of about 5 mm$^2$ to about 30 mm$^2$, preferably from about 5 mm$^2$ to about 15 mm$^2$, and most preferably about 10 mm$^2$. In the case of a plurality of air inlet slits, the combined cross-sectional opening area of the plurality of air inlet slits is preferably about 10 mm$^2$.

As mentioned earlier, embodiments of the present invention preferably do not regenerate the desiccant, since it is provided in a removable and disposable container. As such, this approach does not include any of the purging, vacuum, or re-generation steps found in known industrial systems.

However, in an alternative embodiment, the replaceable air dryer of the present invention can include a wired-in heating coil to regenerate the desiccant. The heating coil is preferably on all the time, whether air is being dried or not. In this way, the system can provide a replaceable air dryer that does not have to be replaced as frequently, and still only holds a modest amount of desiccant. In other words, the system can provide a small-scale air dryer for a water treatment system, where the air dryer cartridge is able to regenerate the enclosed desiccant by way of a heating coil. The heating coil is preferably powered by the base unit to which the cartridge is attached, though a power source, such as a battery, can be integrated into the cartridge itself.

As mentioned earlier, a desiccant is a drying agent, or a substance that promotes drying. In some cases, a desiccant is a drying agent which is capable of removing or absorbing moisture from the atmosphere in a small enclosure. Some common desiccants include: silica gel, commonly provided as beads; and calcium carbonate, commonly provided as granules, like crushed stones.

A preferred desiccant according to an embodiment of the present invention is alumina silicate ($SiO_2$) since it has been found to be non-carcinogenic to humans. For example, a commercially available product called EnviroGel is 98.2% amorphous silica ($SiO_2$), and 0.2% maximum of colouring agent. The activation agent is ACGIH (0.3 μg/m³), which is not classified as hazardous waste under EEC guidelines. Most known approaches use carcinogenic materials, partly because the desiccant is not directly exposed to people or their environment; typically, such a desiccant is provided in a pouch placed inside a product packaging and is disposed of shortly after opening the package.

Since the present invention is for use in a small enterprise or household water treatment system, the desiccant is exposed to people and their food, for example when ozonated water is used to clean produce. Therefore, there is a need for a non-carcinogenic desiccant in a water purification system, a need which has not really existed in the prior art. While $SiO_2$ is used in pouches for product packaging to take moisture out of air to prevent damage caused by moisture to products being shipped, it has not been used in known systems as a desiccant in a water purification or treatment system.

Experimental testing has shown that about 30 grams of desiccant is a presently preferred volume for about 3-6 months of life before the cartridge needs to be replaced. This is based on an average of 1-2 uses per day. In contrast, most known industrial systems employing a regeneration process would use something in the order of 1 kilogram, or 1 liter, of desiccant.

Of course, other amounts of desiccant can be used, depending on the desired life and physical size of the cartridge. For example, based on an average of 1-2 uses per day, a cartridge with 60 grams of desiccant would last for about 9-12 months, whereas a cartridge with 10 grams of desiccant would last about 1 month.

Also, the present invention provides about 1 liter of dry air per minute. This is equivalent to 60 liters/hour, or 2.3 cubic feet/hour. This is on a different scale from known systems, which are said to provide from 15 to 5000 cubic feet of oxygen per hour.

Removable Cartridge with Combined Air Dryer and Water Filter

Figure 6:
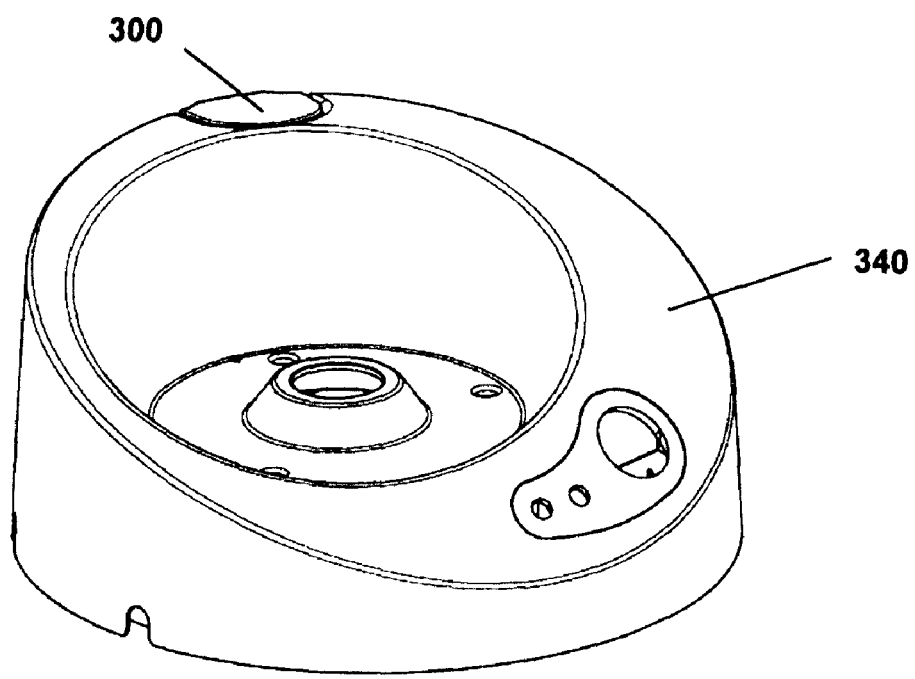
FIG. 6 is a front view of a base unit of a drinking water sanitization system according to an embodiment of the present invention having a removable filter cartridge.

FIG. 6 is a front view of a base unit of a drinking water sanitization system according to an embodiment of the present invention having a removable cartridge. The removable cartridge 300 shown in FIG. 6 is a combined dual purpose filter/dryer cartridge, which is a particular embodiment of the removable cartridge 108 where the cartridge includes both an air dryer 110 and a water filter 112. The air dryer 110 is provided in a chamber in communication with an air flow path and the water filter 112 is provided in a chamber in communication with a water flow path. As such, the two chambers are functionally isolated from one another. In such an embodiment, the cartridge is preferably positioned in the system before the ozone generator in the air flow path, and between the bump and the ozone mixer in the water flow path. If the removable cartridge were to only include the water filter 112, it could be placed at any point in the water system, though placing it early in the water cycle has obvious advantages. The removable cartridge is preferably located at the back of the unit and blends in aesthetically to the rest of the unit.

The purpose of the water filter 112 is to extract large particles of material that might have been drawn into the water stream from the reservoir 102. This can protect the unit from becoming clogged by sediment. The water filter 112 preferably includes a permeable membrane (not shown). Water enters the water filter 112 and then is forced through the permeable membrane, which can be any kind of material such as paper, stainless steel mesh, fabric, etc. Once the water has passed through the membrane, the water is forced back into the main base unit and then into the ozone contacting device 120.

In other words, in an aspect, the present invention provides a removable disposable combined water filter and air dryer cartridge for a small enterprise water ozonation system having a water flow path and an air flow path. The cartridge includes a water filter chamber including a water filter to extract particles of material from the water flow path to prevent damage to the system. The water filter can include a permeable membrane. The cartridge also includes an air dryer chamber provided in the air flow path. The air dryer chamber includes: an air inlet portion defining an air inlet opening to receive atmospheric air; a container portion, connected to the air inlet portion, including a desiccant material to remove moisture from atmospheric air; and a dry air outlet portion, connected to the container portion, the dry air outlet portion defining an outlet opening and comprising a base unit interface for interfacing with the air flow path of a base unit of the small enterprise water ozonation system to provide dry air to an ozone generator. The air dryer chamber can include all of the other features described previously in relation to the removable disposable air dryer cartridge.

Figure 7:
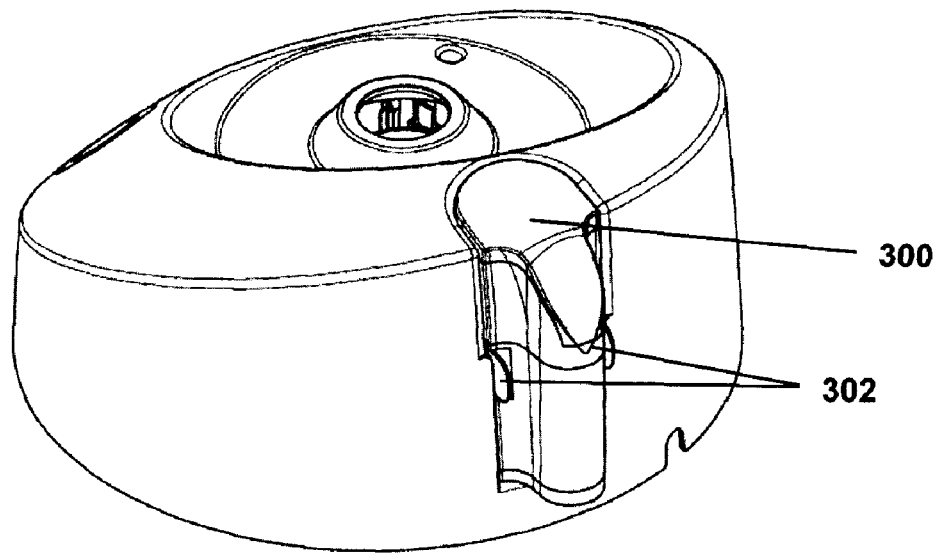
FIG. 7 is a rear view of a base unit of a drinking water sanitization system according to an embodiment of the present invention having a removable filter cartridge.

FIG. 7 is a rear view of a base unit of a drinking water sanitization system according to an embodiment of the present invention having a removable filter cartridge. The view from the back of base unit shows the filter cartridge 300 in the assembled position. Mechanical retaining means, or a mechanical locking mechanism, 302 is preferably provided for easy removal when the cartridge 300 is ready to be replaced. FIG. 7 illustrates finger tabs 302 as an embodiment of the mechanical retaining means, which preferably co-operate with a cartridge receiving portion of base unit 340 to achieve mechanical retention or locking. To remove the cartridge the consumer can simply squeeze the two snap tabs 302 and pull the cartridge 300 out from the main base unit. The filter is currently designed to be held in place by the two snap feature, however any mechanical retaining or locking mechanism can be used.

Figure 8:
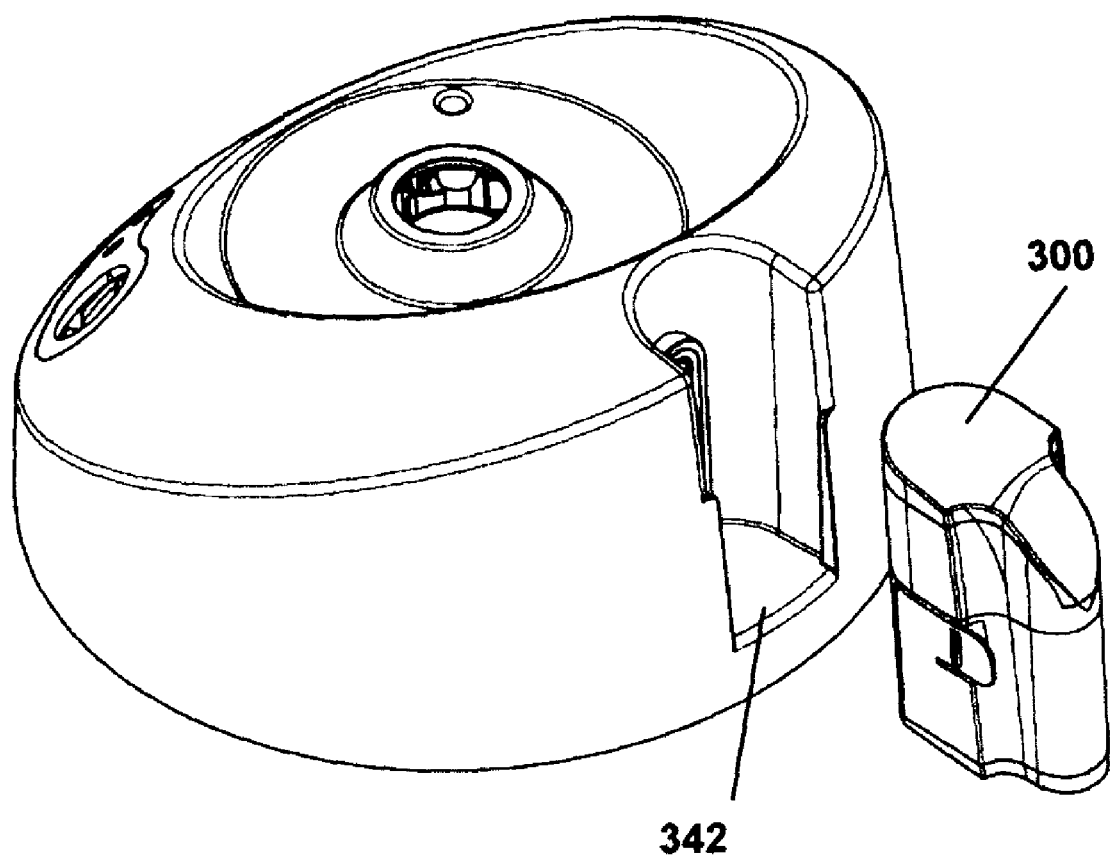
FIG. 8 illustrates the system of FIG. 7 with the cartridge removed.

FIG. 8 illustrates the system of FIG. 7 with the cartridge 300 removed. The filter cartridge 300 is easily slid out from the base unit and a new replacement cartridge can be installed in the same way. The cartridge receiving portion 342 of the base unit 340 is shown to have a shape that mates with the shape of the cartridge 300. According to present embodiments, the expected life of the filter is currently 3 months; however, the filter can be designed to last for a longer or shorter amount of time.

Figure 9:
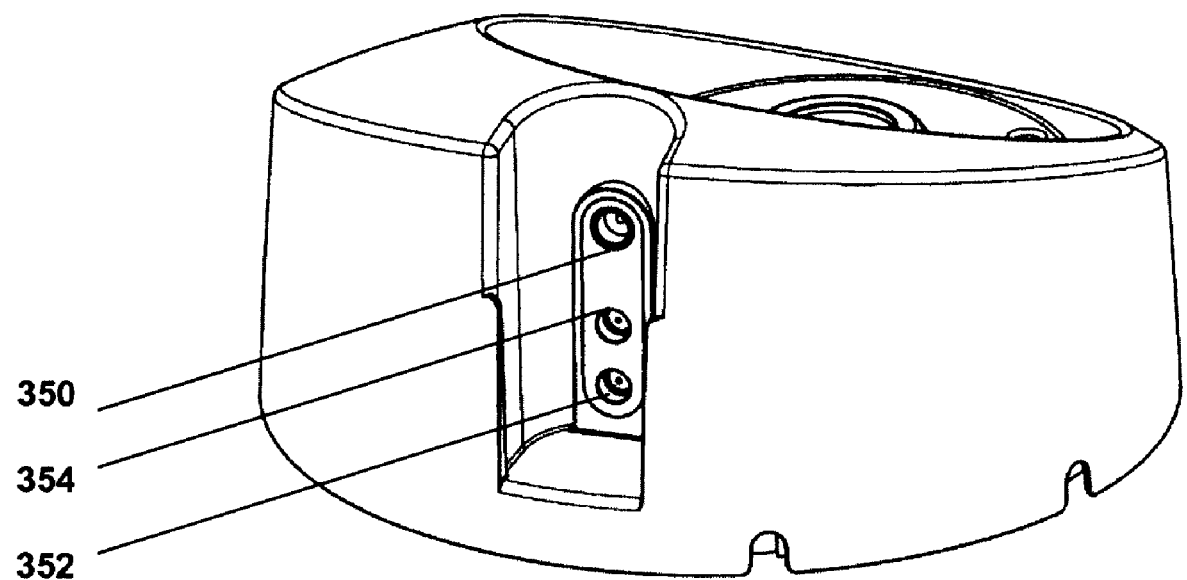
FIG. 9 illustrates a base unit according to an embodiment of the present invention showing ports for receiving the removable filter cartridge.

FIG. 9 illustrates a base unit according to an embodiment of the present invention showing ports for receiving the removable filter cartridge 300. The number of ports provided in the base unit depends on the type of filter cartridge used. If the filter cartridge includes an air dryer 110, then an air dryer base port 350 is provided to connects to the air pathway prior to the ozone generator 116.

If the filter cartridge includes a water filter 112, then a base unfiltered water port 352 and a base filtered outlet port 354 are provided. In the embodiment shown in FIG. 9, the lower port 352 is the inlet to the filter from the pump and the upper port 354 is the outlet from the filter to the ozone contacting device, or venturi. Although the embodiment shown in FIG. 9 includes three such ports 350, 352 and 354, it is to be understood that the base unfiltered water port 352 and the base filtered water port 354 could be provided at a single base water port having a dual check valve, with a corresponding change being made to the removable filter cartridge 300.

Figure 10:
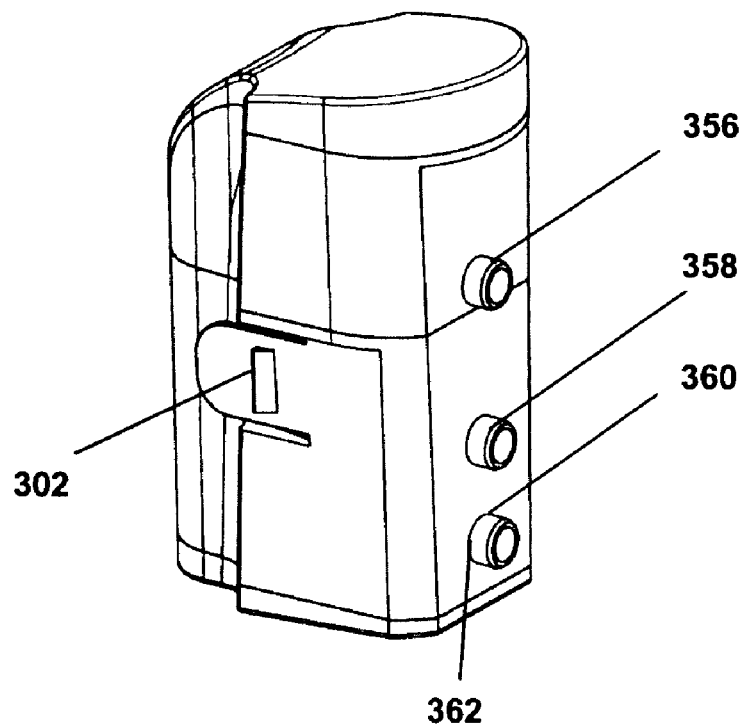
FIG. 10 illustrates a perspective view of a removable filter cartridge according to an embodiment of the present invention.

FIG. 10 illustrates a perspective view of a removable filter cartridge according to an embodiment of the present invention. The filter cartridge of FIG. 10 comprises an air dryer 110 and a water filter 112. The exterior of the filter cartridge comprises ports that connect to the mating interface attached to the base unit. A cartridge air dryer port 356 mates with the base air dryer port 350. A cartridge unfiltered water port 358 mates with the base unfiltered water port 352, while a cartridge filtered water port 360 mates with the base filtered water port 354. Of course, if the base unfiltered water port 352 and the base filtered water port 354 are provided at a single base water port having a dual check valve, the cartridge is then provided with a single cartridge water port having a dual check valve. The cartridge ports can be sealed from atmosphere by the use of a seal, such as an o-ring, that slips into the o-ring grooves 362 as shown in FIG. 10.

Figure 11:
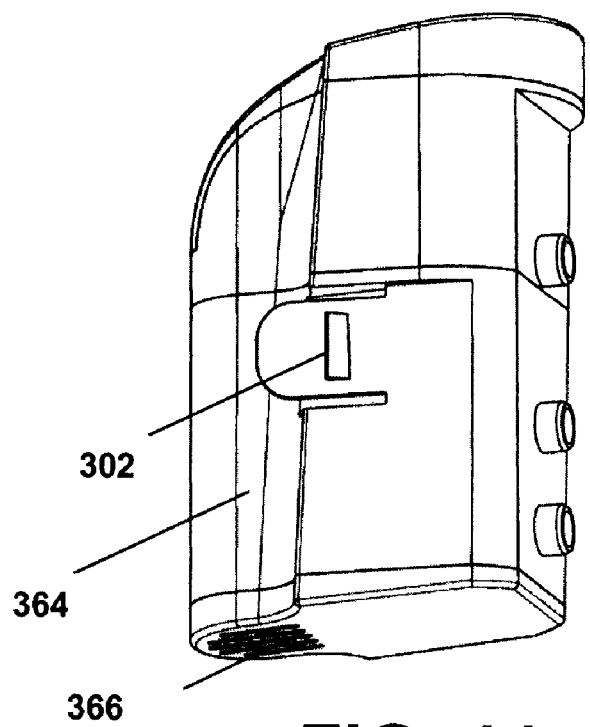
FIG. 11 illustrates the removable filter cartridge of FIG. 10 showing further features of an air filter portion.

FIG. 11 illustrates the removable filter cartridge of FIG. 10 showing further features of an air dryer 110. Snap tabs 302 are provided to lock the cartridge 300 into the base unit. The back thinner part 364 of the cartridge 300 in FIG. 10 is the air dryer which holds the desiccant material. It has an air inlet 366 from atmosphere, shown here as grates. The air inlet 366 can be any form of opening to atmosphere that is capable of retaining the desiccant and drawing air in from atmosphere. The air inlets can be positioned anywhere on the air dryer 110. The long tube shape of the back thinner part 364 maximizes exposure to the desiccant. An entry port is preferably provided at an opposite end of an exit port so that the air travels through all of the beads.

Figure 12:
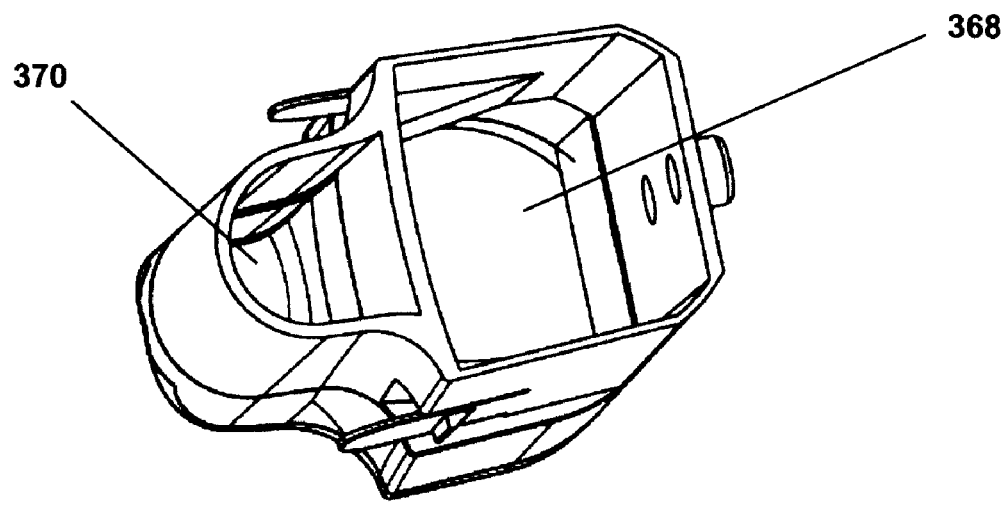
FIG. 12 is a top view of the removable filter cartridge of FIG. 10 showing the inner chambers.

FIG. 12 is a top view of the removable filter cartridge of FIG. 10 showing the inner chambers. Two chambers inside the cartridge are shown here. The air dryer 110 comprises an air dryer chamber 368 on the left of the figure, which is filled with the desiccant material. The water filter 112 comprises a water filter chamber 370 on the right of the figure, in which the permeable membrane (not shown) is provided. In a presently preferred embodiment, the air dryer chamber and water filter chamber are provided in an integrally formed filter cartridge.

Figure 13:
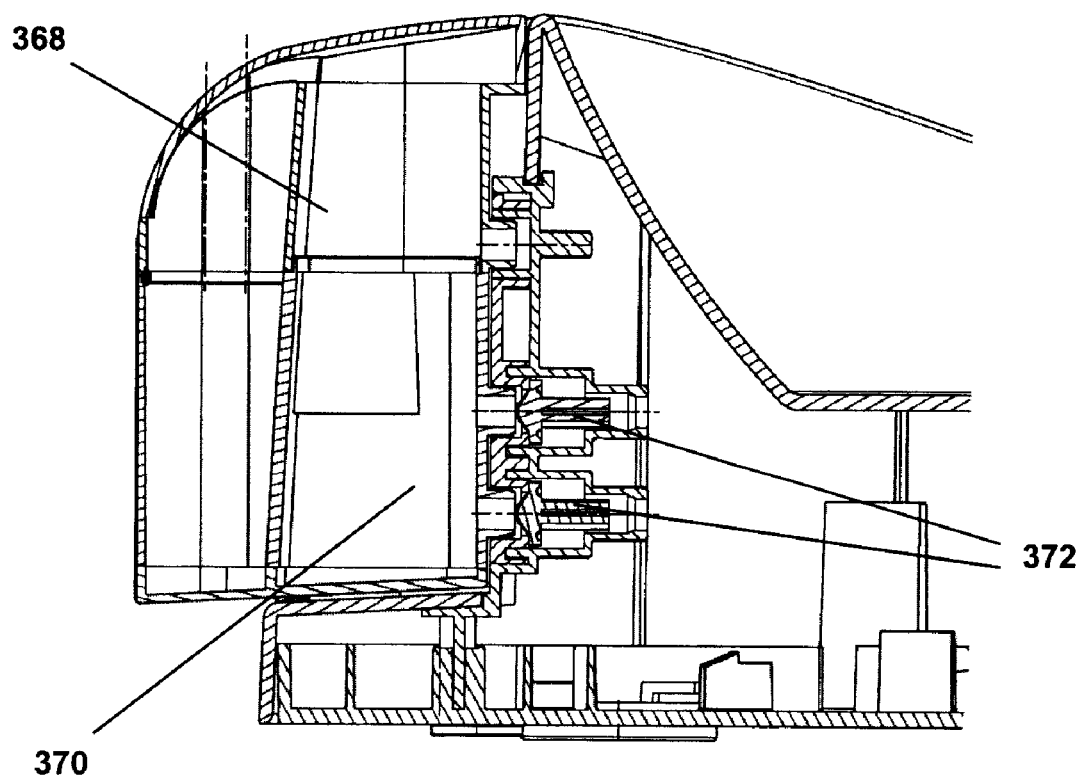
FIG. 13 illustrates a side view in section of a base unit with removable filter cartridge in place according to an embodiment of the present invention.

FIG. 13 illustrates a side view in section of a base unit with the removable filter cartridge in place according to an embodiment of the present invention. The figure shows the air dryer chamber 368 and the water filter chamber 370. The cartridge can include an outer housing in which both chambers are provided, and one or both of the chambers is removably attached. Having the air dryer and the water filter as individual, or separate, cartridges or cartridge chambers allows them to be designed for different length lives and the water filter can be located in any location in the water system. For ease to the consumer, it is beneficial to only have to replace one cartridge that can do everything. When the filter is removed for replacement, plungers 372 can be provided to seal the main base unit and prevent water from leaking out of the unit.

System to Deal with Undesirable System Status

When a removable reservoir is used in conjunction with a base unit, such as the scenarios described above with the use of the removable cartridge, there are many instances where an undesirable system status can adversely affect the performance of the system. There are known systems that provide solutions for some such scenarios. For instance, one known system monitors the current drawn by the water pump and can terminate a dispense cycle by de-energizing the pump when the monitored current changes to a lower current associated with cavitation of the water pump. Essentially, the system stops dispensing when it is detected that there is no more water left to dispense. The system also optionally includes a cycle counter to determine when one or more filters should be replaced, by counting the number of treatment cycles and signalling a user after a preset number of cycles.

However, such a known system only controls dispensing of treated water after the treatment process has been completed and identifies an appropriate time for replacement of the water filter. There are undesirable system conditions that can occur during the water treatment process for which known systems do not provide solutions. For instance, if a reservoir is removed in mid-cycle when the base unit is processing water, this can cause damage to the system, particularly due to emission of ozone gas to atmosphere.

As such, methods and a system are also provided for automatically interrupting operation of a small enterprise water treatment unit by measuring an electric current drawn by a pump motor during a water treatment phase, and temporarily deactivating the unit based on a comparison of the sensed pump motor current with a pump motor current threshold. Methods include overcurrent detection, undercurrent detection, and a pump priming method.

Figure 14:
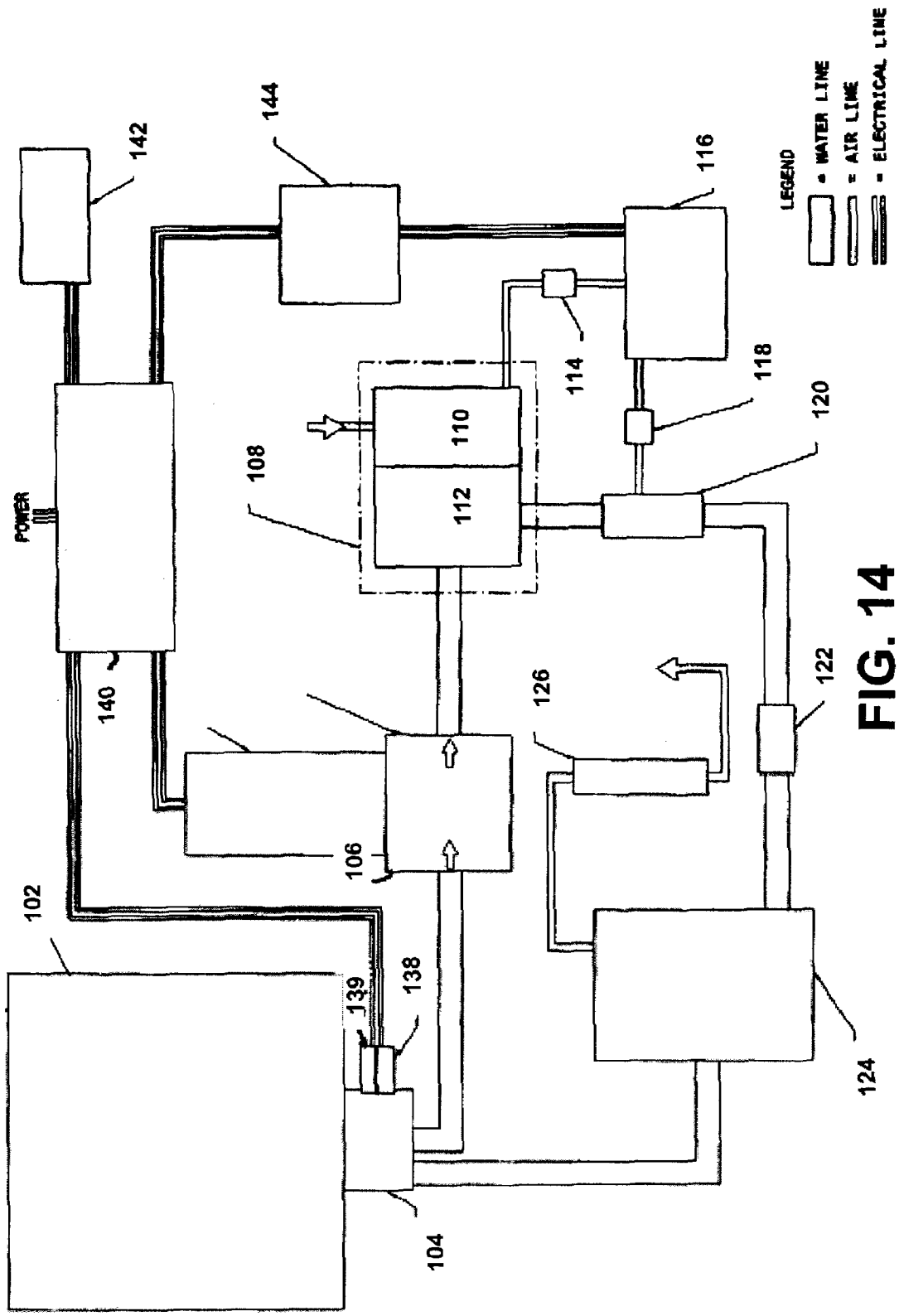
FIG. 14 is a mechanical and electrical system diagram of a drinking water sanitization system according to an embodiment of the present invention.

FIG. 14 is a mechanical and electrical system diagram of a drinking water sanitization system according to an embodiment of the present invention. FIG. 14 shows both water and air paths, and also includes the electronics of the unit, as well as how the electronics interact with the air and water lines. Sensors can preferably provided in the system in order to provide enhanced functionality. Sensors 138 and/or 139 are preferably provided after the fluid transfer valve 104. The sensors 138 and 139 can be implemented as a mechanical switch, electronic sensor, or any other type of sensor or combination thereof.

The sensor 138, or ozone concentration sensor, can monitor the ozone concentration level in the water in combination with a controller, or control board, 140. Although a control board is described in relation to embodiments of the present invention, other types of controllers, such as combinations of logic gates or circuits (mechanical, optical, electronic, electromagnetic, fluidic, etc.), can be used to provide the desired control. The system can be turned off if the monitored ozone concentration level exceeds an upper ozone concentration limit, and can be turned on if the monitored ozone concentration level falls below a lower ozone concentration limit. Alternatively, a single ozone concentration level can function as both an upper limit and a lower limit. The system can be turned on in response to the sensed or measured ozone concentration level and/or in response to a timed ozonation cycle.

The sensor 138 determines whether the measured ozone level is high enough with respect to the water in the reservoir. Such measurement is desirable since it takes a while for water in the reservoir to all mix together. The sensor 138 can be placed anywhere in the water line of the system. However, the position shown in FIG. 14 is a presently preferred location since it is always exposed to flowing water, resulting in continuous reading. Moreover, the ozone level at this point right after the reservoir will yield more accurate results with respect to "safe" measurement, since the ozone concentration level is lower at that point than anywhere else in the water line.

In summary, the ozone concentration sensor can be provided after the fluid transfer valve. The system status indication can be one of: type of reservoir, current status, whether processing is in progress, or time left in processing. The system can include a first check valve at an inlet of the ozone generator, and a second check valve at the outlet of the ozone generator, to reduce residual ozone gas diffusion to atmosphere.

The control board 140 preferably includes a computer-readable memory storing statements and instructions for performing steps as described above. A display board 142 is preferably provided, in communication with the control board 140, to permit display of indications relating to the status of the system. For example, the display board 140 could display information relating to the monitored ozone concentration level detected by the sensor. The display board 140 can also display the measured ozone concentration in the system and whether the system is active or inactive, as well as how much time is left in the processing. A high voltage transformer 144 is preferably provided in order to take the power provided to the control board 140 and convert it to a power level suitable for driving the ozone generator 116.

A sensor 139, or reservoir detection/discrimination sensor, can be used, in combination with a control board 140, to detect the presence or absence of a reservoir 102, and preferably detects differences between types of reservoir that can be placed on the system. The sensor 139 can be provided instead of, or in addition to, the sensor 138 discussed above. With the sensor 139, there would be no need to select between different modes or treatment times for different types of reservoirs, since the process would be automatic. Of course, a suitable identifying means would preferably be provided as part of the reservoir 102 in order that the sensor can make a distinction between different types of reservoirs. The identifying means could be a physical attribute of the reservoir, or could be an electronic identifier, such as a contact, resistor, inductive tag, or any other suitable means.

In other words, in an aspect, the present invention provides a small enterprise water treatment system including a reservoir sensor to identify a type of reservoir placed on the system. The system also includes a controller to automatically select and execute a stored water treatment process in response to identification of the type of reservoir by the reservoir sensor. The system further includes a display board, in communication with the controller, to display a system status indication. The system status indication can relate to the type of reservoir and/or the automatically selected water treatment process.

The control board 140 preferably includes a computer-readable memory storing statements and instructions for performing steps as described above. A display board 142 is preferably provided, in communication with the control board 140, to permit display of indications relating to the status of the system. For example, the display board 140 could display information relating to the type of reservoir detected by the sensor. The display board 140 can also display the current status of the system, whether processing is being performed, and how much time is left in the processing. A high voltage transformer 144 is preferably provided in order to take the power provided to the control board 140 and convert it to a power level suitable for driving the ozone generator 116.

In physical implementation, the outlet of the pump cap, the venturi and all connecting tubes are preferably provided at the same elevation as the inlet to the off-gas unit. This means that any residual water in the off-gas will drain back into the pump head when the unit is at rest. Doing this makes the off-gas double as both a gas-liquid separator and also as a priming well. This means that in our system the pump does not have to be a positive displacement pump which means its cost is significantly reduced. This can also be accomplished by having the pump outlet port, venturi and tubes located below the inlet to the off-gas unit.

Figure 15B:
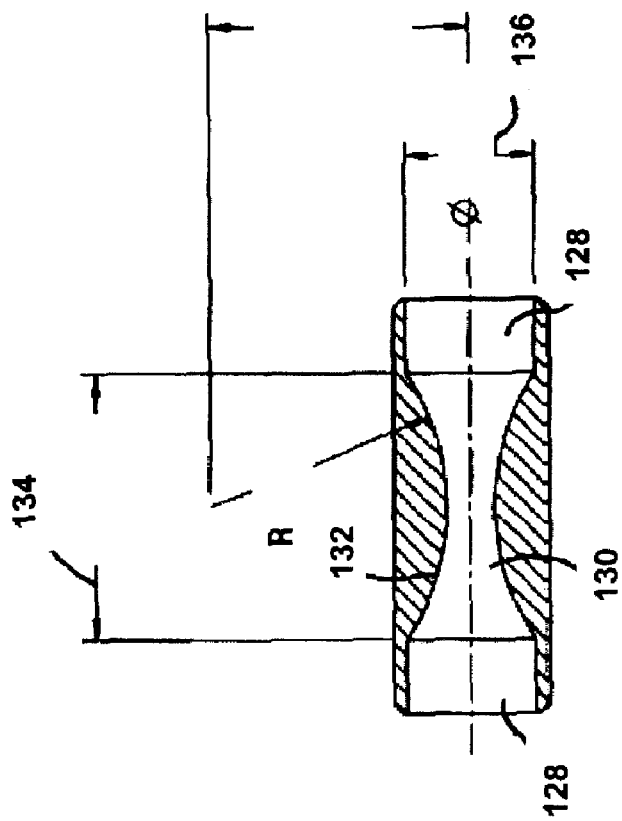
FIG. 15B is a section view along line A-A of FIG. 15A.
Figure 15A:
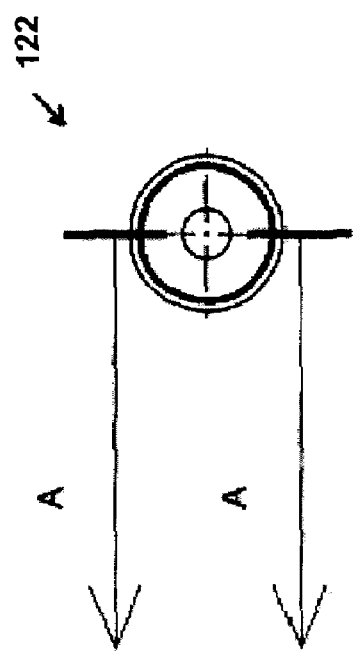
FIG. 15A is a front view of an ozone gas atomizer for a drinking water sanitization system according to an embodiment of the present invention.

FIG. 15A is a front view of an ozone gas atomizer 122, such as shown in FIG. 14, for a drinking water sanitization system according to an embodiment of the present invention. The atomizer 122 can be placed inline inside a silicone tube. The in-line atomizer 122 breaks down the gas bubbles again into micro-bubbles. This also means that the micro bubbles are still present as the liquid/gas mixture enters the off-gas unit.

FIG. 15B is a section view along line A-A of FIG. 15A. The geometry of the atomizer contributes to its function. The inside shape is contoured so that water that travels into it tapers down to a point, then expands again, creating turbulence and an eddy. End portions 128 can be substantially cylindrical and shaped to allow good water flow and to mate with adjacent components. A tapered center portion 130 includes a curved wall 132 defining a tapered center passage of the atomizer 122. FIG. 15B illustrates exemplary measurements and proportions for a tapered center passage length 134 and a tapered center passage height 136 which have been found to provide better performance than some other geometries.

In summary, the system can further include an ozone gas atomizer downstream of the ozone contacting device and just before the inlet port of the off-gas system. The ozone gas atomizer can define an inner core with a tapered center portion having a smaller cross-section than cylindrical ends of the inner core. The system can further include an accumulator at the top of the off-gas system, and can further include a sealing check valve between the off-gas system and the ozone destructor. The outlet of the pump cap, the venturi and all connecting tubes can be provided at the same elevation as the inlet to the off-gas system.

Embodiments of the present invention include methods for controlling the pump motor 106, and the entire system, based on detected parameters. There are many instances where an undesirable system status can adversely affect the performance of the system. As such, there is a need to be able to identify such undesirable system status conditions.

There are some known approaches that attempt to deal with similar issues. Some such approaches control the system in response to an identification of an undesirable system condition based on a measured physical pressure delivered by the pump. However, such pressure measurements may not account for as wide a variety of undesirable system status conditions as desired. Embodiments of the present invention provide a manner of identifying undesirable system status conditions based on sensing or measurement of a pump motor current, or a current drawn by the pump motor, in order that appropriate measures can be taken in each case. Many major undesirable system status conditions can be grouped into two categories: those causing a pump motor current to fall below a pump motor undercurrent level; and those causing a pump motor current to rise above a pump motor overcurrent threshold level.

In an aspect, the present invention provides a method of automatically interrupting operation of a water treatment unit, the unit including an ozone generator, a pump and a pump motor to drive the pump. The method includes the following steps: measuring an electric current drawn by the pump motor during a water treatment phase; and temporarily deactivating the unit based on a comparison of the sensed pump motor current with a pump motor current threshold. Temporarily deactivating the unit can further include sending a signal to display a system status indication. Various embodiments will now be described.

While many aspects will be described in relation to methods, it is to be understood that these methods are typically implemented by a controller, and include the necessary means to perform the steps in the method.

In other words, in another aspect, the present invention provides a water treatment system including an ozone generator, a pump and a pump motor to drive the pump. The system includes a controller including a shut-off means to temporarily deactivate the system in response to an undesirable system condition. The undesirable system condition is based on a comparison of a sensed pump motor current with a pump motor current threshold during a water treatment phase. The system also includes a display board, in communication with the controller, to display a system status indication. The system further includes an ozone concentration sensor, in electrical communication with the controller, to monitor an ozone concentration level in water. The system can include means to sense an electric current drawn by the pump motor during a water treatment phase. This system can include a reservoir sensor as described previously, along with the related features of the controller and system status indication.

The following conditions have all been found to have a similar measurable effect on a system according to an embodiment of the present invention, and are a result of a motor undercurrent condition:

1) The reservoir has been detached part way through a processing cycle causing the pump to draw in air.
2) The reservoir was not attached when the cycle was started, thus the unit draws in only air.
3) There is a leak in the water system allowing air to be drawn into the pump head.
4) There is too little water in the reservoir allowing either a mix of air and water or just air to be drawn into the water stream.

In each of the above cases, an increased level of air or gas is observed in the pump head portion of the pump motor. This results in a corresponding drop in the current draw of the pump motor when there is too little resistance in the water stream part of the pump head.

As seen in FIG. 14, the control board 140 is connected to the pump motor 106 and can control the pump motor. A microprocessor is preferably provided as part of the control board 140 according to an embodiment of the present invention. The microprocessor stays in constant communication with the pump motor by continuously monitoring the electric current that the motor draws in order to drive the pump. The sensing or measurement of the electric current drawn by the pump motor 106 can be done via a program on the microprocessor. Alternatively, a dedicated current sensor or any other sensor, not shown in the drawings, can complement or replace the sensing or measurement via the program on the microprocessor.

A motor undercurrent level is set with respect to a normal operating current draw for the unit. A normal operating current draw for the pump motor 106 in a particular embodiment of the present invention is 275 mA. Therefore, in such a case, the motor undercurrent level, or low current draw level, is defined as 100 mA. If the current draw of the pump motor falls below the motor undercurrent level for a set length of time, the microprocessor determines that there is a problem with the system flow and shuts the unit down. The set length of time can be referred to as a motor undercurrent time, i.e. the amount of time that is required for the measured motor current draw to stay below the motor undercurrent level. Shutting down the unit preferably includes turning off the ozone generator 116, turning off the pump 106 and sending a signal to the display board 142 to display an error message.

This motor undercurrent detection method is an improvement over known approaches partly because it makes the unit more reliable and safe to a consumer. Some improvements, or advantages, it adds to the unit are:

1) The unit can last longer because pump, seals or motor components will not run dry and wear out prematurely.
2) Shutting down the ozone generator prevents the generation of excess ozone gas that would have the possibility of leaking out of the system to atmosphere and potentially becoming harmful to a consumer.
3) The consumer is notified immediately that there is a problem with the unit and can take appropriate action to correct the problem.

The motor undercurrent level can be set at any suitable value with respect to the normal operating current draw. The particular example of 100 mA was found to be the most suitable for an exemplary embodiment that was tested, but other levels are possible and within the scope of embodiments of the present invention. Variations in the type of pump head or motor used, different back pressures inherent to the system, or any combination of these, can result in a variation of the normal operating current draw. This will result in a corresponding variation in the motor undercurrent level, then the lower current draw setting will vary according to the different parameters. The motor undercurrent time can vary as well, although experimental tests showed that a preferred amount of time is between 0-3 seconds, since this is a convenient amount of time for a consumer.

In other words, in one embodiment, temporarily deactivating the unit can include shutting down the unit, by a shut-off means, if the sensed pump motor current falls below a motor undercurrent level for a set length of time. The motor undercurrent level can be about 100 mA, and the set length of time can be from about 0 to about 3 seconds. In this case, shutting down the unit can include one of: turning off the ozone generator; or turning off the pump.

The following conditions have all been found to have a similar measurable effect on a system according to an embodiment of the present invention, and are a result of a motor over-current condition:

1) Clogging of the water lines or any of the components due to sediment that has been drawn in to the Base unit from the reservoir and lodged itself in a way to block water flow.
2) A pinched water line or a kink in the water line that blocks the water path.
3) A clogging of the entry ports in the reservoir by material in the reservoir.
4) An improperly attached reservoir preventing the Dual Check Valve from opening.
5) An improperly assembled unit that misdirects the water flow in a way that would cause a blockage.

In each of the above cases, there is an increased resistance in the water stream line. This results in a corresponding rise in the current draw of the pump motor when there is an increased resistance in the water stream part of the pump head.

The discussion above in relation to the connection of the microprocessor of the control board 140 to the pump motor 106 applies to this method as well.

A motor overcurrent level is set with respect to a normal operating current draw for the unit. A normal operating current draw for the pump motor 106 in a particular embodiment of the present invention is 275 mA. Therefore, in such a case, the motor overcurrent level, or high current draw level, is defined as 450 mA. If the current draw of the pump motor rises above the motor overcurrent level for a set length of time, the microprocessor determines that there is a problem with the system flow and shuts the unit down. The set length of time can be referred to as a motor overcurrent time, i.e. the amount of time that is required for the measured motor current draw to stay above the motor overcurrent level. Shutting down the unit preferably includes turning off the ozone generator 116, turning off the pump 106 and sending a signal to the display board 142 to display an error message.

This motor overcurrent detection method is an improvement over known approaches partly because it makes the unit more reliable and safe to a consumer. Some improvements, or advantages, it adds to the unit are:
1) The unit will last longer because no board or motor components will continue to run with an excessive current draw causing components to overheat or wear out prematurely.
2) The pump will not continue to run which if it did would cause the pressure in the system to build up and potentially rupture either components or water lines, thus destroying the product.
3) The ozone generator shuts down which prevents the generation of excess ozone gas which would have the possibility of leaking out of the system to atmosphere and potentially becoming harmful to a consumer.
4) The consumer is notified immediately that there is a problem with the unit and can take appropriate action to correct the problem.

The motor overcurrent level can be set at any suitable value with respect to the normal operating current draw. The particular example of 450 mA was found to be the most suitable for an exemplary embodiment that was tested, but other levels are possible and within the scope of embodiments of the present invention. Variations in the type of pump head or motor used, different back pressures inherent to the system, or any combination of these, can result in a variation of the normal operating current draw. This will result in a corresponding variation in the motor undercurrent level. Then the lower current draw setting will vary according to the different parameters. The motor overcurrent time can vary as well, although experimental tests showed that a preferred amount of time is between 0-3 seconds, since this is a convenient amount of time for a consumer.

In other words, temporarily deactivating the unit can include shutting down the unit, by a shut-off means, if the sensed pump motor current rises above a motor overcurrent level for a set length of time. The motor overcurrent level can be about 450 mA, and the set length of time can be from about 0 to about 3 seconds.

Many pumps and motors are preferably primed prior to initial use. Priming can generally be defined as filling a machine (e.g., a pump) with the necessary fluid before starting, in order to improve its sealing qualities.

There are several circumstances that could contribute to the pump losing its prime upon initial cycle start up. These circumstances include:
1) The reservoir has been detached part way through a processing cycle causing the pump to draw in air.
2) The reservoir was not attached when the cycle was started, thus the unit draws in only air.
3) There is a leak in the water system allowing air to be drawn into the pump head.
4) There is too little water in the reservoir allowing either a mix of air and water or just air to be drawn into the water stream.
5) An air bubble was trapped in the line when an attachment was removed and replaced.
6) It was the first time the unit had been activated upon purchase by the consumer and it was shipped dry.
7) A consumer had drained the water out of the Base Unit and thus filled the water lines with air.
8) The water had evaporated out of the unit due to lack of use allowing air to get into the pump head.

When the base unit is initially turned on and a cycle start button is activated on a control panel of the base unit, there is a high possibility that air will have been trapped in either the pump head or have been drawn into the pump head upon activation. This causes the pump to loose its prime and drops the current draw of the pump motor below a pump prime current level, or low current setting.

The discussion above in relation to the connection of the microprocessor of the control board 140 to the pump motor 106 applies to this method as well.

A pump prime current level is set with respect to a normal operating current draw for the unit. A normal operating current draw for the pump motor 106 in a particular embodiment of the present invention is 275 mA. Therefore, in such a case, the pump prime current level, or low pump current draw level, is defined as 100 mA. Though the examples of motor undercurrent level and pump prime current level provided herein are the same value, it is to be understood that these values are determined independently and will not necessarily be the same.

All of these reasons created a need to ensure that the pump was able to successfully prime itself upon initial cycle activation before the control board 140 turned everything off via the motor undercurrent detection method described above. Since the microprocessor was already monitoring the amount of current the pump motor was drawing, it was decided that if for a pump prime detection time (e.g. the first 3 seconds after cycle start-up) the current dropped below the pump prime current level (meaning no prime was achieved), the pump would be deactivated. It would stay deactivated for a pump prime waiting time (e.g. 2 seconds) before the control board 140 would again give power to it and run it for a pump prime correction time (e.g. an additional 3 seconds). If during this 3 second run the pump manages to prime itself, then the current draw from the motor would rise above the pump prime current level and the system will continue to run as normal.

However, the pump motor may still not achieve prime after running once through the pump prime waiting time and the pump prime correction time, collectively referred to as a pump prime recovery cycle. In such a case, turning the pump motor on and off as described above would preferably continue until either the pump motor successfully primes, or until a pump prime failure time (e.g. 30 seconds) expires. In the latter case, an error message will be displayed on the display board 142 indicating that the pump was not able to prime. This eventuality would occur if the consumer had done something incorrectly in setting up the unit prior to cycle start. In essence, the pump is pulsed on and off (through pump prime recovery cycles) for up to 30 seconds to induce prime.

This is an improvement to current base unit design because it makes the unit more reliable and safe to a consumer. Improvements added to the unit include:
1) The unit can last longer because pump, seals or motor components will not run dry and wear out prematurely.
2) The ozone generator does not turn on until a successful pump prime has been achieved. This prevents the generation of excess ozone gas that would have the possibility of leaking out of the system to atmosphere and potentially become harmful to a consumer.
3) The consumer is notified immediately that there is a potential problem with the unit and can take appropriate action to correct the problem.
4) The pump used in the base unit does not have to be a positive displacement pump.

The pump prime current level can be set at any suitable value with respect to the normal operating current draw. The particular example of 100 mA was found to be the most suitable for an exemplary embodiment that was tested, but other levels are possible and within the scope of embodiments of the present invention. Variations in the type of pump head or motor used, different back pressures inherent to the system, or any combination of these, can result in a variation of the normal operating current draw. This will result in a corresponding variation in the pump prime current level. The amount of time running the motor, keeping the motor off or the duration of the entire cycle can vary, although experimental tests showed that the exemplary times provided above were the most suitable. Although all these variables may change, the method according to embodiments of the present invention pulses the pump motor to induce prime.

Embodiments of the present invention make use of the pump motor priming feature only on initial activation of the unit. This is provided as an additional safety feature to the over-/under-current detection which happens all the time.

The pump priming protection method can be applied to any kind of system that has issues with a pump that needs priming, in order to guarantee that the system is going to work properly, as intended. One exception is positive displacement pumps, because they prime themselves.

In other words, in a further embodiment, temporarily deactivating the unit can include shutting down the unit, by a shut-off means, if the sensed pump motor current falls below a pump prime current level for a set length of time. The pump prime current level can be about 100 mA, and the set length of time can be about 3 seconds. Shutting down the unit can include one of: turning off the ozone generator; or turning off the pump.

Temporarily deactivating the unit can include initiating a pump prime recovery cycle. In that case, the pump prime recovery cycle can include: deactivating the pump for a duration of a pump prime waiting time, then activating the pump for a duration of a pump prime correction time. The pump prime recovery cycle can be repeated until the pump motor successfully primes or until expiry of a pump prime failure time.

Although the motor undercurrent detection method, motor overcurrent detection method and pump priming detection method have been described in relation to embodiments shown in FIGS. 1 and 14, it is to be understood that many of the elements shown in those figures are not required in order to implement those methods. Such elements include the removable filter cartridge, the inlet and outlet check valves, the ozone gas atomizer, and the ozone destructor.

As mentioned above, the methods described herein can also be provided as part of a system that implements the methods. Therefore, in an aspect, the present invention provides a water treatment system including an ozone generator, a pump and a pump motor to drive the pump. The system includes a controller having a shut-off means to temporarily deactivate the system in response to an undesirable system condition. The undesirable system condition is based on a comparison of a sensed pump motor current with a pump motor current threshold. The system includes a reservoir sensor to detect the presence of a reservoir, and a display board, in communication with the controller, to display a system status indication. The system also includes an ozone concentration sensor, in electrical communication with the controller, to monitor an ozone concentration level in water.

The shut-off means can alternatively be described as being provided to temporarily deactivate the system in response to detection of improper reservoir attachment, with the detection being based on pump current measurement/sensing. Improper reservoir attachment can include removal of the reservoir before or during the water treatment phase, or improper seating of the reservoir on the base unit.

The system can further include means to sense an electric current drawn by the pump motor during a water treatment phase.

The shut-off means can shut down the system if the sensed pump motor current falls below a motor undercurrent level, such as about 100 mA, for a set length of time, such as from about 0 to about 3 seconds. Shutting down the system can include one of: turning off the ozone generator; or turning off the pump.

The shut off means can shut down the system if the sensed pump motor current rises above a motor overcurrent level, such as about 450 mA, for a set length of time, such as from about 0 to about 3 seconds.

The shut off means can shut down the system if the sensed pump motor current falls below a pump prime current level, such as about 100 mA, for a set length of time, such as about 3 seconds. Shutting down the system can include one of: turning off the ozone generator; or turning off the pump. Temporarily deactivating the system can include initiating a pump prime recovery cycle, which itself can include deactivating the pump for a duration of a pump prime waiting time, then activating the pump for a duration of a pump prime correction time. The pump prime recovery cycle can be repeated until the pump motor successfully primes or until expiry of a pump prime failure time.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A removable disposable air dryer cartridge for a small enterprise water ozonation system, comprising:
    an air inlet portion defining an air inlet opening to receive atmospheric air, the air inlet opening being sized to enable air flow during operation and to allow insignificant air flow when the system is idle, and having an air inlet cross sectional opening area of about 5 $mm^2$ to about 30 $mm^2$, the air inlet opening comprising a plurality of air inlet slits;
    a container portion, connected to the air inlet portion, comprising a desiccant material to remove moisture from atmospheric air; and
    a dry air outlet portion, connected to the container portion, the dry air outlet portion defining an outlet opening and comprising a base unit interface for interfacing with an air pathway of a base unit of the small enterprise water ozonation system to provide dry air to an ozone generator.

2. The cartridge of claim 1 wherein an air inlet cross sectional opening area is about 5 $mm^2$ to about 15 $mm^2$.

3. The cartridge of claim 2 wherein an air inlet cross sectional opening area is about 10 $mm^2$.

4. The cartridge of claim 1 wherein a combined cross-sectional opening area of the plurality of air inlet slits is about 10 $mm^2$.

5. The cartridge of claim 4 wherein the air inlet portion defines two air inlet slits positioned opposite each other along the perimeter of the air inlet portion.

6. The cartridge of claim 1 wherein the air outlet opening is sized to enable air flow during operation and to allow insignificant air flow when the system is idle.

7. The cartridge of claim 1 wherein the container portion defines a desiccant viewing window to view the colour of the desiccant.

8. The cartridge of claim 1 wherein the desiccant material is non-carcinogenic.

9. The cartridge of claim 1 wherein the desiccant material comprises $SiO_2$.

10. The cartridge of claim 1 comprising about 30 grams of the desiccant material.

11. The cartridge of claim 1 wherein the cartridge is valveless.

12. A removable disposable combined water filter and air dryer cartridge for a small enterprise water ozonation system having a water flow path and an air flow path, the cartridge comprising:
    a water filter chamber including a water filter to extract particles of material from the water flow path to prevent damage to the system;
    an air dryer chamber provided in the air flow path, the air dryer chamber comprising:
    an air inlet portion defining an air inlet opening to receive atmospheric air, the air inlet opening being sized to enable air flow during operation and to allow insignificant air flow when the system is idle, and having an air inlet cross sectional opening area of about 5 $mm^2$ to about 30 $mm^2$;
    a container portion, connected to the air inlet portion, comprising a desiccant material to remove moisture from atmospheric air; and
    a dry air outlet portion, connected to the container portion, the dry air outlet portion defining an outlet opening and comprising a base unit interface for interfacing with the air flow path of a base unit of the small enterprise water ozonation system to provide dry air to an ozone generator.

13. The cartridge of claim 12 wherein an air inlet cross sectional opening area is about 5 $mm^2$ to about 15 $mm^2$.

14. The cartridge of claim 13 wherein an air inlet cross sectional opening area is about 10 $mm^2$.

15. The cartridge of claim 12 wherein the air inlet portion opening comprises a plurality of air inlet slits.

16. The cartridge of claim 15 wherein a combined cross-sectional opening area of the plurality of air inlet slits is about 10 $mm^2$.

17. The cartridge of claim 15 wherein the air inlet portion defines two air inlet slits positioned opposite each other along the perimeter of the air inlet portion.

18. The cartridge of claim 12 wherein the air outlet opening is sized to enable air flow during operation and to allow insignificant air flow when the system is idle.

19. The cartridge of claim 12 wherein the container portion defines a desiccant viewing window to view the colour of the desiccant.

20. The cartridge of claim 12 wherein the desiccant material is non-carcinogenic.

21. The cartridge of claim 12 wherein the desiccant material comprises $SiO_2$.

22. The cartridge of claim 12 comprising about 30 grams of the desiccant material.

23. The cartridge of claim 12 wherein the air dryer chamber is valveless.

24. The cartridge of claim 12 wherein the water filter includes a permeable membrane.

\* \* \* \* \*